Nov. 16, 1926.
H. L. MITCHELL
DEVICE FOR STABILIZING TRUCK OR TRAILER CRANES
Filed Nov. 2, 1925
1,606,771
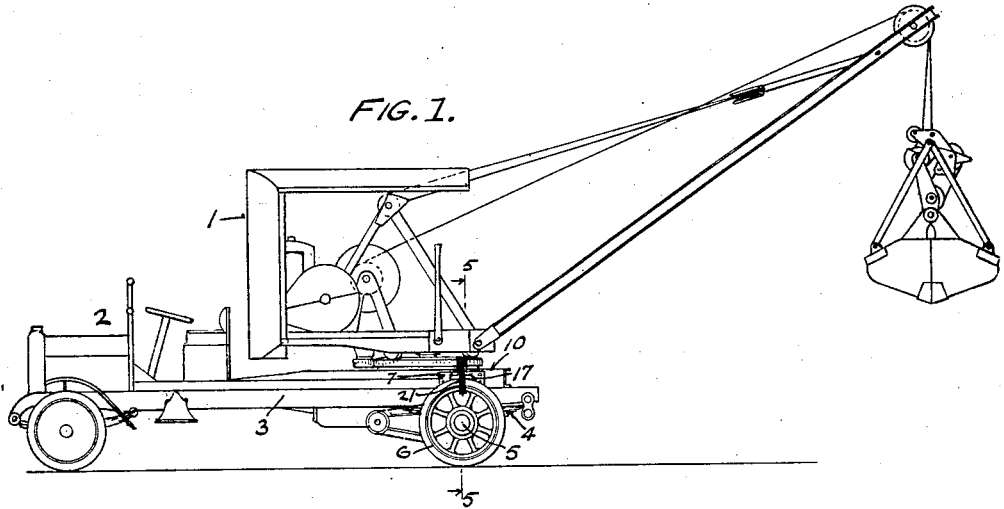
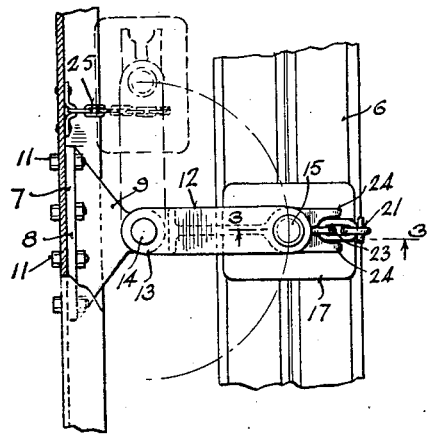
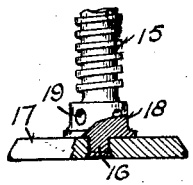
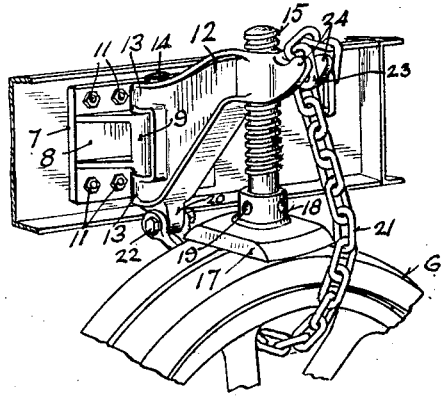
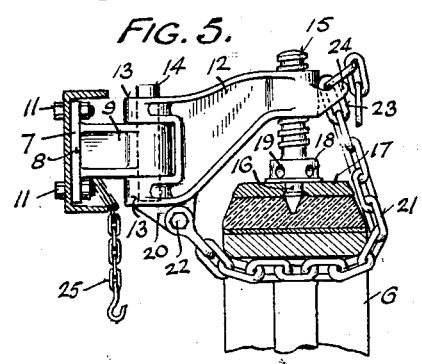
INVENTOR.
HOLGER L. MITCHELL
BY
Bottum, Hudnall, Lecher and McNamara.
ATTORNEYS.

Patented Nov. 16, 1926.

1,606,771

UNITED STATES PATENT OFFICE.

HOLGER L. MITCHELL, OF MILWAUKEE, WISCONSIN, ASSIGNOR TO HARNISCHFEGER CORPORATION, OF MILWAUKEE, WISCONSIN, A CORPORATION OF WISCONSIN.

DEVICE FOR STABILIZING TRUCK OR TRAILER CRANES.

Application filed November 2, 1925. Serial No. 66,196.

This invention relates to improvements in devices for stabilizing a truck or trailer crane.

Cranes of the heavier type for lifting large loads have heretofore been mounted upon tractors or railway rolling stock especially designed therefor. A tractor and a railway car are particularly adapted for supporting these heavy-duty cranes for the reason that they have considerable weight themselves and provide a rigid and non-yieldable support for the crane, and do not give or tilt any appreciable amount when the loaded boom is swung over to either side. With the advent of the large motor trucks for heavy work and the truck trailers, there has been created a demand for cranes of the larger size adapted to be mounted upon these trucks or trailers, the latter providing an adequate support and permitting of more rapid transportation of the cranes from one place to another. When the loaded boom is swung over to either side in operating the crane, however, the truck spring on the boom side becomes fully compressed, the truck frame and the crane mounted thereon tilting over on this side at an appreciable angle. In trucks or trailers such as are utilized for supporting these cranes, there is always some loose play due to lost motion in the rear axle or between the axle and wheels, or due to other loose connections caused by continual operation, and as is well known, merely blocking the truck or trailer wheels will not provide against this loose play.

One of the objects of the present invention, therefore, is to provide means for preventing this tilting movement of the truck or trailer frames when the loaded boom is swung over to one side or the other, and, further, to lock the wheels of the truck or trailer against movement.

Another object is to provide an improved device of the character referred to which may be readily attached to a truck or trailer frame and adjusted for coaction or engagement with the wheels whereby the frame is directly supported by the latter and held thereby against tilting movement.

Another object is to provide an improved device of the character referred to which relieves the truck or trailer springs of the heavy loads to which the crane is subjected, which prevents loose play between the truck or trailer frame and the wheels thereof, and which locks the wheels.

Another object is to provide an improved device of the character referred to which is adapted to be readily attached to a truck or trailer whereby the latter provides as rigid and as good a support for heavy-duty cranes as the tractors and railway cars upon which the latter have been mounted heretofore.

Another object is to provide an improved device of the character referred to which is simple in construction and which may be manufactured at a comparatively small cost.

Other objects and advantages will hereinafter appear.

For the purpose of illustrating the invention, an embodiment thereof is shown in the drawings, in which—

Figure 1 is a side elevation, showing a heavy-duty crane mounted upon a motor truck and the improved device attached thereto;

Fig. 2 is a plan view of the improved device;

Fig. 3 is a fragmentary, sectional view, the section being taken on line 3—3 of Fig. 2;

Fig. 4 is a perspective view of the improved device, showing the manner in which it is attached to each side of the truck frame and arranged for engagement or coaction with the wheels; and Fig. 5 is an enlarged section on line 5—5 of Fig. 1.

Referring to Fig. 1, the crane, designated generally by the reference numeral 1, is shown mounted upon the motor truck 2, the crane being constructed as a unit and mounted upon the truck in the same manner in which cranes of this type are mounted upon tractors or railway flat cars. The truck frame 3 is supported in the usual manner upon springs 4 secured to axles 5 having wheels 6 at each end thereof.

As more clearly shown in Figs. 2 and 4, a bracket 7 comprising a base plate 8 and a bearing 9 is secured to each of the side frame members 10 of the truck frame 3 by means of bolts 11. An arm 12 is provided at one end thereof with apertured lugs 13 arranged to receive bearing 9, a pin 14 extending through the bearing and lugs for connecting arm 12 to bracket 7 for pivotal movement with respect thereto. A screw 15 is threaded through the free end of arm 12 for axial adjustment with respect thereto, the reduced lower end 16 of the screw being swiveled in any suitable manner in a plate 17, as more clearly shown in Fig. 3. Screw 15 may be provided with an enlarged portion 18 formed integrally therewith and provided with holes 19 for receiving a suitable tool for effecting axial adjustment of the screw. The pivoted end of arm 12 is provided with a lug 20 to which one end of a flexible element or chain 21 is anchored by means of a pin 22, the chain being adapted to be passed through the spokes of wheel 6, as shown, and anchored at its other end by inserting one of the links 23 of the chain between lugs 24 cast or formed integrally with the free end of arm 12, the lugs being spaced apart a distance slightly greater than the thickness of the links whereby the adjacent upper and lower links which are disposed at substantially right angles to the link between lugs 24 lock the chain in position and prevent the same from slipping through the lugs.

As shown in Fig. 4, in applying the device some play is left between the rim of wheel 6 and chain 21. Screw 15 is then adjusted axially with respect to arm 12 until plate 17 bears upon the wheel a sufficient amount to lift the adjacent portion of frame 3 upward a slight amount whereby the springs 4 are relieved from the greater part of the combined weight of the truck frame and crane 1 and the frame and crane supported directly by wheels 6. The play in chain 21 is thereby taken up and the wheel gripped firmly between the chain and plate 17, as shown in Fig. 5.

From the foregoing it will be seen that a device has been provided which may be readily attached to a truck frame and adjusted for engagement with the wheels of the truck whereby the frame and the crane or other load mounted on the truck are supported directly by the wheels, and the frame of the truck held by the latter against tilting movement when the loaded boom is swung to either side. It is also to be noted that the wheels 6 are securely gripped between plates 17 and chains 21 whereby the wheels are locked against rotation.

When the device is not in use arm 12 may be swung about pin 14 against the side frame member 7 of the truck, as shown in dotted lines in Fig. 2, and held in this position by any suitable means such as a chain 25.

The improved device has been shown applied to a motor truck, but of course it is of much broader adaptation and may be used in other connections and applied to trailers and vehicles of other types.

A preferred embodiment of the invention has been shown and described, but of course various changes in the size, shape and arrangement of the parts may be adopted without departing from the spirit of the invention or the scope of the claims.

The invention claimed is:

1. In a jack of the character described, a bracket having a base plate adapted for attachment to a vehicle frame member and a bearing, an arm provided with an apertured lug arranged to align with said bearing, a pin extending through said bearing and said lug for connecting said arm to said bracket for pivotal movement with respect thereto, a screw threaded through the free end of said arm for axial adjustment with respect thereto, and a wheel-engaging member carried by one end of said screw.

2. In a jack of the character described, a bracket comprising a base plate adapted for attachment to a vehicle frame member and a bearing, an arm provided with apertured lugs arranged to receive said bearing, a pin extending through said bearing and said lugs for connecting said arm to said bracket for pivotal movement with respect thereto, a screw threaded through the free end of said arm for axial adjustment with respect thereto, a wheel-engaging member loosely carried by one end of said screw, and means associated with said screw for adjusting the same axially with respect to said arm, opposite ends of said arm being provided with means to which the ends of a flexible element may be anchored after the latter is passed through said wheel.

3. The combination with a vehicle comprising a frame, an axle having a wheel at each end thereof, and springs arranged between said axle and said frame to normally permit movement of the latter with respect to said axle, of arms pivoted to said frame at each side thereof, their free ends being adapted to be swung outwardly over said wheels, screws threaded through said ends of said arms and provided at their lower ends with clamping shoes adapted for engagement with said wheels whereby the latter may be utilized to directly support said frame and hold the same against movement with respect to said wheels, and flexible elements extending through said wheels and anchored at their ends to said arms.

4. A jack of the character described comprising a base plate having a bearing, an arm, a pin pivotally connecting one end of said arm to said bearing, a wheel-engaging member adjustably carried by the free end of said arm, an element adapted to be passed through said wheel, means for anchoring one end of said element to the pivoted end of said arm, the free end of said arm being provided with lugs arranged to receive and interlock with the other end of said element whereby said wheel may be clamped between said element and said wheel-engaging member.

5. The combination with a vehicle comprising a frame, an axle having a wheel at each end thereof, and springs arranged between said axle and said frame to normally permit movement of the latter with respect to said axle, of jack arms secured to said frame one at each side thereof, jacks carried by said arms for engagement with said wheels to hold said frame against such movement in one direction, and means also carried by said arms for engagement with said wheels to hold said frame against such movement in the opposite direction.

6. The combination with a vehicle comprising a frame, an axle having a wheel at each end thereof, and springs arranged between said axle and said frame to normally permit movement of the latter with respect to said axle, of jack arms pivotally connected to said frame one at each side thereof for swinging movement into or out of overhanging relation with respect to said wheels, jacks carried by said arms for engagement with said wheels to hold said frame against such movement in one direction, and means for holding said frame against such movement in the opposite direction.

In witness whereof I hereto affix my signature.

HOLGER L. MITCHELL.